US009635669B2

(12) United States Patent
Gormley et al.

(10) Patent No.: US 9,635,669 B2
(45) Date of Patent: Apr. 25, 2017

(54) METHOD AND SYSTEM FOR COEXISTENCE OF RADAR AND COMMUNICATION SYSTEMS

(71) Applicant: EDEN ROCK COMMUNICATIONS, LLC, Bothell, WA (US)

(72) Inventors: Eamonn Gormley, Bothell, WA (US);
Jungnam Yun, Bothell, WA (US);
Rekha Menon, Bothell, WA (US)

(73) Assignee: SPECTRUM EFFECT, INC., Seattle, WA (US)

( * ) Notice: Subject to any disclaimer, the term of this patent is extended or adjusted under 35 U.S.C. 154(b) by 495 days.

(21) Appl. No.: 14/449,921

(22) Filed: Aug. 1, 2014

(65) Prior Publication Data
US 2015/0289265 A1 Oct. 8, 2015

Related U.S. Application Data

(63) Continuation of application No. 14/446,151, filed on Jul. 29, 2014.

(60) Provisional application No. 61/931,849, filed on Jan. 27, 2014.

(51) Int. Cl.
| H04W 72/04 | (2009.01) |
| H04W 24/02 | (2009.01) |
| H04L 1/00 | (2006.01) |
| H04L 5/00 | (2006.01) |
| H04W 16/14 | (2009.01) |

(52) U.S. Cl.
CPC ....... *H04W 72/0446* (2013.01); *H04L 1/0003* (2013.01); *H04L 1/0009* (2013.01); *H04L 5/0078* (2013.01); *H04W 16/14* (2013.01); *H04W 24/02* (2013.01)

(58) Field of Classification Search
CPC .......... H04W 72/085; H04W 72/1231; H04W 72/1226; H04W 16/14; H04W 72/0446; H04W 72/12; H04L 5/006; H04L 5/0085
See application file for complete search history.

(56) References Cited

U.S. PATENT DOCUMENTS

| 7,330,698 | B1 * | 2/2008 | Bolt | H04W 16/10 455/63.1 |
| 7,469,013 | B1 * | 12/2008 | Bolt | H04L 1/0003 375/260 |
| 8,614,964 | B1 * | 12/2013 | Vargantwar | H04L 1/0002 370/252 |
| 2002/0086641 | A1 * | 7/2002 | Howard | H04L 1/0006 455/67.11 |
| 2002/0155811 | A1 * | 10/2002 | Prismantas | H04B 1/1027 455/63.1 |
| 2005/0025194 | A1 * | 2/2005 | Adjakple | H04W 56/0015 370/516 |
| 2007/0281638 | A1 * | 12/2007 | Hansen | G01S 7/021 455/127.4 |
| 2009/0296629 | A1 * | 12/2009 | Lincoln | H04B 7/18589 370/321 |

(Continued)

*Primary Examiner* — Devan Sandiford

(57) ABSTRACT

A method for scheduling wireless transmissions in a wireless communications network in the presence of pulsed interference includes receiving pulsed interference information, determining transmission opportunities based on the pulsed interference information, and when a transmission time interval (TTI) is less than a time of an opportunity of the transmission opportunities, transmitting a wireless signal during the opportunity.

14 Claims, 9 Drawing Sheets

(56) References Cited

U.S. PATENT DOCUMENTS

| | | | | |
|---|---|---|---|---|
| 2010/0317355 A1* | 12/2010 | Zangi | .................... | H04L 1/0001 |
| | | | | 455/450 |
| 2012/0002737 A1* | 1/2012 | Tupala | .................. | H04L 5/1469 |
| | | | | 375/259 |
| 2012/0033619 A1* | 2/2012 | Corral | .................. | H04L 1/0003 |
| | | | | 370/329 |
| 2014/0313910 A1* | 10/2014 | Appleton | .................. | H04L 1/20 |
| | | | | 370/252 |
| 2015/0031327 A1* | 1/2015 | Townley | ............... | H04W 16/18 |
| | | | | 455/405 |

* cited by examiner

METHOD AND SYSTEM FOR COEXISTENCE OF RADAR AND COMMUNICATION SYSTEMS

CROSS-REFERENCES TO RELATED APPLICATIONS

The present invention claims priority to U.S. Provisional Application No. 61/931,849, filed Jan. 27, 2014, which is incorporated by reference herein for all purposes.

This invention was made with government support under contract number HR0011-13-C-0082, awarded by the Defense Advanced Research Projects Agency (DARPA). The government has certain rights in the invention.

BACKGROUND OF THE INVENTION

The explosive growth of mobile communications has made spectrum a scarce commodity and increased the focus on efficient utilization of the wireless spectrum. In this regard, a number of initiatives have been launched to share under-utilized spectrum assigned to government and military agencies with commercial entities. One of these initiatives addresses sharing the spectrum originally assigned to radar systems with commercial communication networks.

Radar systems typically transmit signals with very high power levels and low duty cycles. A possible strategy for spectrum sharing is to maintain an exclusion zone around the radar systems within which commercial networks cannot operate. The exclusion region is determined by the geographical separation required to prevent mutual interference between the radar and communication systems. However, given the large transmit power levels of radar signals, in the absence of other interference mitigation techniques, the size of the exclusion regions limit the benefits of spectrum sharing.

BRIEF SUMMARY OF THE INVENTION

Embodiments of this disclosure relate to interference mitigation techniques that reduce the mutual interference between the radar and communications systems. Although specific embodiments are described with respect to radar systems, other embodiments are applicable to coexist with other types of pulsed transmissions.

In an embodiment, a method for coexistence with a pulsed interference source in a communications network includes identifying transmission time intervals (TTIs) that are affected by pulses from the pulsed interference source and changing a transmission parameter for the TTIs that are affected by pulses. The method may further include transmitting the TTIs that are affected by pulses using a first transmission scheme and transmitting TTIs other than TTIs that are affected by pulses using a second transmission scheme that has higher transmission rate than the first modulation scheme. The communications network may be a Long Term Evolution communications network, and the transmission scheme may be a Modulation and Coding Scheme (MCS).

The method may further include determining a signal to interference plus noise ratio (SINR) for the TTIs that are affected by pulses, and the transmission parameter may be changed based on the determined SINR. In an embodiment, the SINR is calculated based on a location and a transmit power of the pulsed interference source. In another embodiment, the SINR is determined based on measurements by a receiver of the communications network.

In an embodiment, the method includes transmitting the TTIs that are affected by pulses at a first forward error correction (FEC) rate and transmitting TTIs other than TTIs that are affected by pulses at a second FEC rate that is higher than the first FEC rate. Changing the transmission parameter may include changing a modulation scheme and changing an FEC rate. The method may further include identifying a dwell time of consecutive interfering pulses and lowering one of a modulation scheme and an FEC rate during an opportunity between adjacent dwell times.

In an embodiment, a method for coexistence with a pulsed interference source in a communications network includes receiving a communications signal, determining a first portion of the communications signal that is affected by the pulsed interference source, blanking the first portion of the communications signal, and processing the communications signal. Determining the first portion of the communications signal includes dividing a transmission time interval (TTI) into a plurality of subunits. The method may further include determining energy values for the subunits, determining an average energy for the subunits, and calculating ratios between the energy value for each subunit and the average energy.

In an embodiment, the method further includes comparing the ratios to a threshold value, and when a ratio exceeds the threshold value, blanking the subunit associated with the ratio that exceeds the threshold value. The method may further include comparing a size of the first portion to a threshold value, wherein blanking the first portion is performed only when the size is greater than the threshold value. Comparing the size of the first portion to a threshold value may include comparing a number of symbols that are affected by the pulsed interference source to the predetermined value.

In the coexistence method, determining the first portion of the communications signal may include comparing pulse times of the pulsed interference source to transmission times of communications signals. The pulse times of the pulsed interference source may be input into the communications network, or they may be determined by measuring pulses at a receiver in the communications network.

In an embodiment, a method for scheduling wireless transmissions in a wireless communications network in the presence of pulsed interference includes receiving pulsed interference information, determining transmission opportunities based on the pulsed interference information, and when a transmission time interval (TTI) is less than a time of an opportunity of the transmission opportunities, transmitting a wireless signal during the opportunity. Determining transmission opportunities may include identifying off-times between radar pulses, and the opportunities may be during the off-times.

In an embodiment, determining transmission opportunities includes determining a buffer time between pulse times, and the transmission opportunities are off times between pulses minus the buffer. The buffer time may be a receive window in which a radar receives reflections or a saturation time during which a receiver is saturated by a received pulse. Determining transmission opportunities may include determining radar dwell times.

In an embodiment, determining radar dwell times includes identifying a plurality of consecutive radar pulses and comparing the plurality of consecutive radar pulses to a threshold value, and the dwell time is a time during which a portion of the consecutive radar pulses exceeds the threshold value. Transmission opportunities may be times between dwell times.

In an embodiment, determining transmission opportunities includes comparing a TTI to an off time between pulses, when the TTI is less than the time between pulses, identifying a transmission opportunity in the time between pulses, and when the TTI is greater than the time between pulses, determining whether a dwell time is present in a pulse pattern.

Receiving pulsed interference information may include measuring channel quality variance at a receiver, when channel quality passes below a threshold value, determining an associated time point as a start of a dwell time, and when channel quality passes above the threshold value, determining an associated time point as an end of a dwell time, and the opportunity may be between consecutive dwell times.

DETAILED DESCRIPTION OF THE INVENTION

Embodiments of this disclosure can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of embodiments is provided below along with accompanying figures. The scope of this disclosure is limited only by the claims and encompasses numerous alternatives, modifications and equivalents. Numerous specific details are set forth in the following description in order to provide a thorough understanding. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
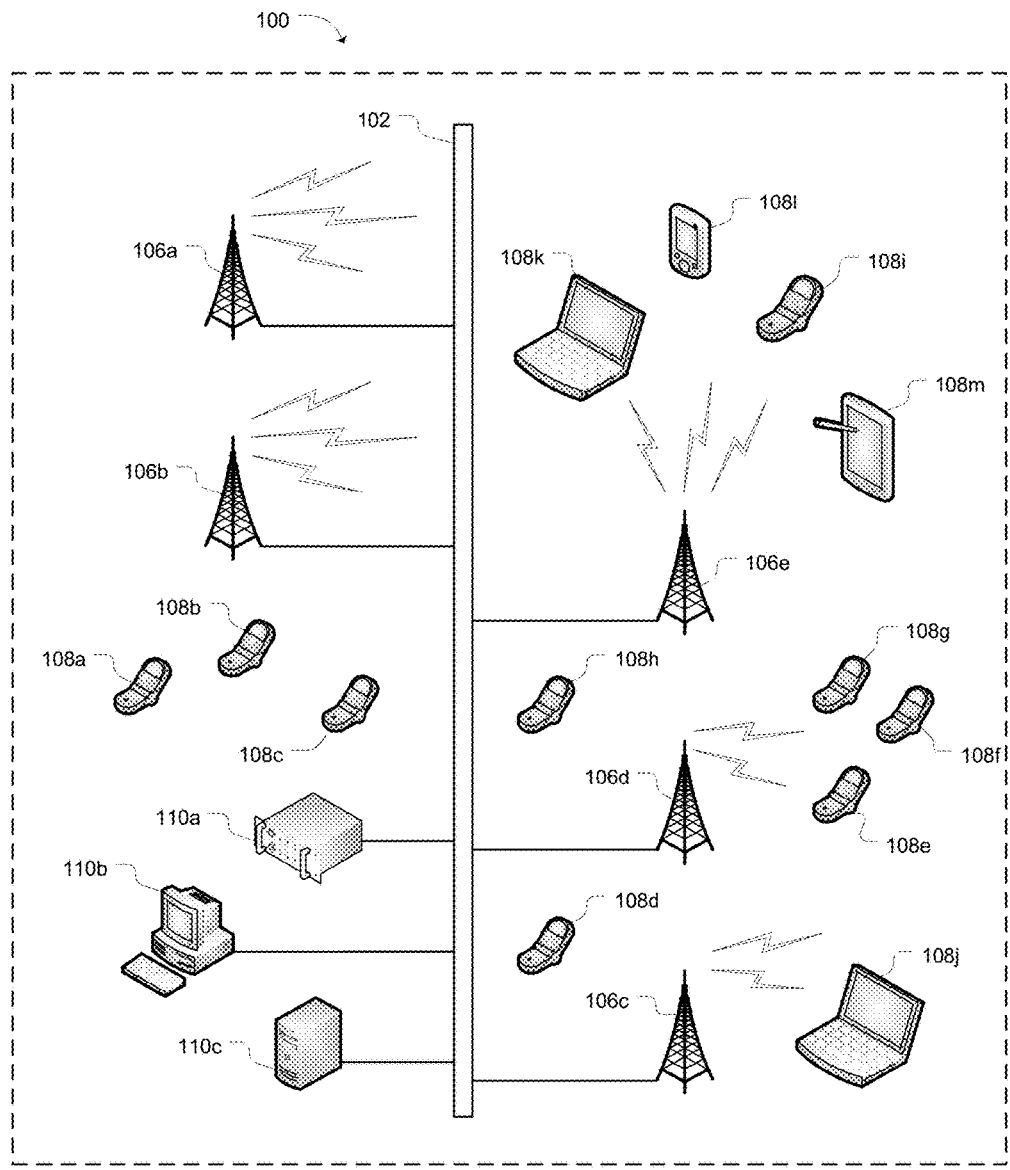
FIG. 1 illustrates a wireless communication system according to an embodiment.

FIG. 1 illustrates a networked communications system 100 according to an embodiment of this disclosure. As depicted, system 100 includes a data communications network 102, one or more base stations 106a-e, one or more network resource controller 110a-c, and one or more User Equipment (UE) 108a-m. As used herein, the term "base station" refers to a wireless communications station provided in a location and serves as a hub of a wireless network. The base stations may include macrocells, microcells, picocells, and femtocells.

In a system 100 according to an embodiment, the data communications network 102 may include a backhaul portion that can facilitate distributed network communications between any of the network controller devices 110a-c and any of the base stations 106a-e. Any of the network controller devices 110a-c may be a dedicated Network Resource Controller (NRC) that is provided remotely from the base stations or provided at the base station. Any of the network controller devices 110a-c may be a non-dedicated device that provides NRC functionality among others. The one or more UE 108a-m may include cell phone devices 108a-i, laptop computers 108j-k, handheld gaming units 108l, electronic book devices or tablet PCs 108m, and any other type of common portable wireless computing device that may be provided with wireless communications service by any of the base stations 106a-e.

As would be understood by those skilled in the Art, in most digital communications networks, the backhaul portion of a data communications network 102 may include intermediate links between a backbone of the network which are generally wire line, and sub networks or base stations 106a-e located at the periphery of the network. For example, cellular user equipment (e.g., any of UE 108a-m) communicating with one or more base stations 106a-e may constitute a local sub network. The network connection between any of the base stations 106a-e and the rest of the world may initiate with a link to the backhaul portion of an access provider's communications network 102 (e.g., via a point of presence).

In an embodiment, an NRC has presence and functionality that may be defined by the processes it is capable of carrying out. Accordingly, the conceptual entity that is the NRC may be generally defined by its role in performing processes associated with embodiments of the present disclosure. Therefore, depending on the particular embodiment, the NRC entity may be considered to be either a hardware component, and/or a software component that is stored in computer readable media such as volatile or non-volatile memories of one or more communicating device(s) within the networked communications system 100.

In an embodiment, any of the network controller devices 110a-c and/or base stations 106a-e may function independently or collaboratively to implement processes associated with various embodiments of the present disclosure.

In accordance with a standard GSM network, any of the network controller devices 110a-c (NRC devices or other devices optionally having NRC functionality) may be associated with a base station controller (BSC), a mobile switching center (MSC), a data scheduler, or any other common service provider control device known in the art, such as a radio resource manager (RRM). In accordance with a standard UMTS network, any of the network controller devices 110a-c (optionally having NRC functionality) may be associated with a NRC, a serving GPRS support node (SGSN), or any other common network controller device known in the art, such as an RRM. In accordance with a standard LTE network, any of the network controller devices 110a-c (optionally having NRC functionality) may be associated with an eNodeB base station, a mobility management entity (MME), or any other common network controller device known in the art, such as an RRM.

In an embodiment, any of the network controller devices 110a-c, the base stations 106a-e, as well as any of the UE 108a-m may be configured to run any well-known operating system, including, but not limited to: Microsoft® Windows®, Mac OS®, Google® Chrome®, Linux®, Unix®, or any mobile operating system, including Symbian®, Palm®, Windows Mobile®, Google® Android®, Mobile Linux®, etc. Any of the network controller devices 110a-c, or any of the base stations 106a-e may employ any number of common server, desktop, laptop, and personal computing devices.

In an embodiment, any of the UE 108a-m may be associated with any combination of common mobile computing devices (e.g., laptop computers, tablet computers, cellular phones, handheld gaming units, electronic book devices, personal music players, MiFi™ devices, video recorders, etc.), having wireless communications capabilities employing any common wireless data communications technology, including, but not limited to: GSM, UMTS, 3GPP LTE, LTE Advanced, WiMAX, etc.

In an embodiment, the backhaul portion of the data communications network 102 of FIG. 1 may employ any of the following common communications technologies: optical fiber, coaxial cable, twisted pair cable, Ethernet cable, and power-line cable, along with any other wireless communication technology known in the art. In context with various embodiments of the invention, it should be understood that wireless communications coverage associated with various data communication technologies (e.g., base stations 106a-e) typically vary between different service provider networks based on the type of network and the system infrastructure deployed within a particular region of a network (e.g., differences between GSM, UMTS, LTE, LTE Advanced, and WiMAX based networks and the technologies deployed in each network type).

Figure 2:
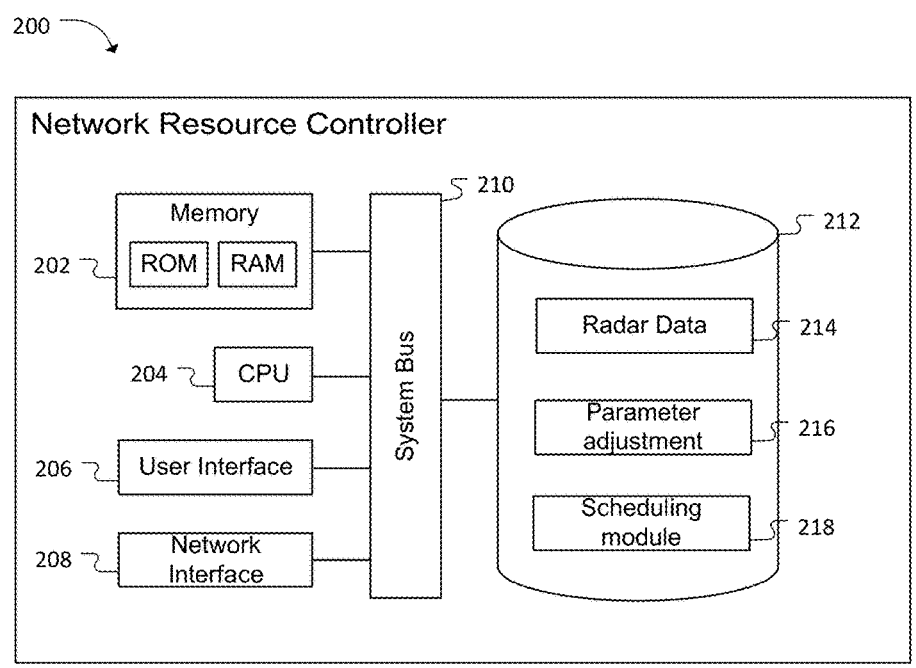
FIG. 2 illustrates a network resource controller according to an embodiment.

FIG. 2 illustrates a block diagram of an NRC 200 that may be representative of any of the network controller devices 110a-c. In an embodiment, one or more of the network controller devices 110a-c are SON controllers. The NRC 200 includes one or more processor devices including a central processing unit (CPU) 204. The CPU 204 may include an arithmetic logic unit (ALU) (not shown) that performs arithmetic and logical operations and one or more control units (CUs) (not shown) that extracts instructions and stored content from memory and then executes and/or processes them, calling on the ALU when necessary during program execution.

The CPU 204 is responsible for executing computer programs stored on volatile (RAM) and nonvolatile (ROM) memories 202 and a storage device 212 (e.g., HDD or SSD). In some embodiments, storage device 212 may store program instructions as logic hardware such as an ASIC or FPGA. Storage device 212 may include radar data 214, a parameter adjustment module 216 which performs functions associated with parameter adjustment, and a scheduling module 218 which performs various scheduling activities. In addition, the storage device 212 may include a blanking module which performs blanking activities, and a processing module which processes signals.

The NRC 200 may also include a user interface 206 that allows an administrator to interact with the NRC's software and hardware resources and to display the performance and operation of the networked computing system 100. In addition, the NRC 300 may include a network interface 206 for communicating with other components in the networked computer system, and a system bus 310 that facilitates data communications between the hardware resources of the NRC 200.

In addition to the network controller devices 110a-c, the NRC 200 may be used to implement other types of computer devices, such as an antenna controller, an RF planning engine, a core network element, a database system, or the like. Based on the functionality provided by an NRC, the storage device of such a computer serves as a repository for software and database thereto.

Embodiments of the present disclosure include a system and method for mitigating interference from a radar system. Depending upon the scenario, various aspects of the processes described herein may be implemented individually or in combination with one another.

Figure 3A:
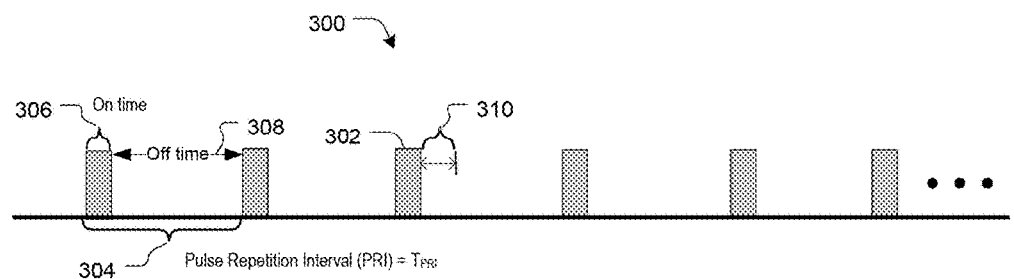
FIG. 3A illustrates a Pulse Repetition Interval of a radar signal.

Radar systems are typically pulsed transmission systems with large transmit power levels and small duty cycles. FIG. 3A shows an example of a typical pulsed radar transmission. The time between pulses 302 is referred to here as the Pulse Repetition Interval (PRI) 304. On-time 306 is the duration in the PRI during which the radar pulse is transmitted. Off-time 308 is the remaining duration of the PRI. The Off-time 308 between pulses 302 may include a receive window 310. A receive window is a period of time in which a radar system receives reflections from the pulses 302.

Some radar systems monitor their environment for targets by directing their transmission and reception in different directions over time. For example, in some radar systems, a radar antenna is mounted on a platform that rotates through a 360 degree arc at a constant rate. Other radar systems may move along an arc that is less than 360 degrees, but such a system will still typically have a regular repeating sweep interval.

Figure 3B:
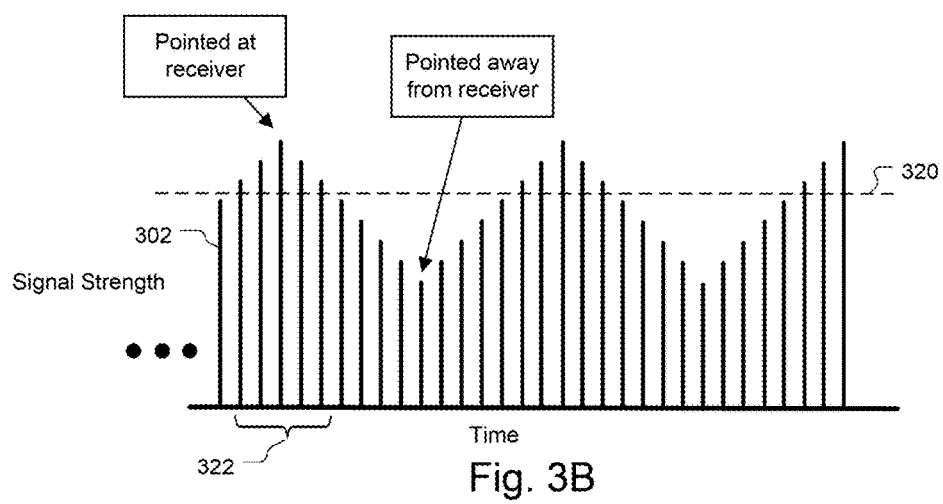
FIG. 3B illustrates dwell cycles of a radar signal.

When a radar transmitter is pointed at a communications network area, interference in the network area will be higher than when transmissions are pointed away from the network area. This concept is illustrated in FIG. 3B, which shows radar pulses 302 of a moving radar transmitter from the perspective of a communications network area. The network area experiences peak interference when the radar signal strength is pointed at a receiver in network, and minimum interference when the radar signal strength is pointed away from the receiver.

FIG. 3B also shows a threshold signal strength value 320, which may also be an interference threshold value. A time duration during which signal strength or interference values exceed the threshold value may be referred to as a dwell time 322. In some embodiments, wireless communications may not be viable during the dwell time 322, but they may be viable in the time interval between dwell times 322.

Figure 4:
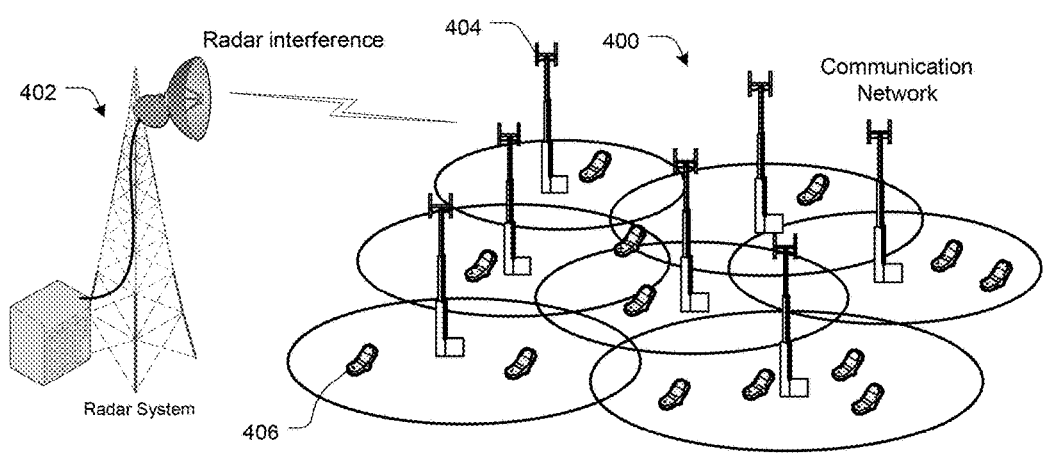
FIG. 4 illustrates a communications network experiencing interference from a radar system.
Figure 5:
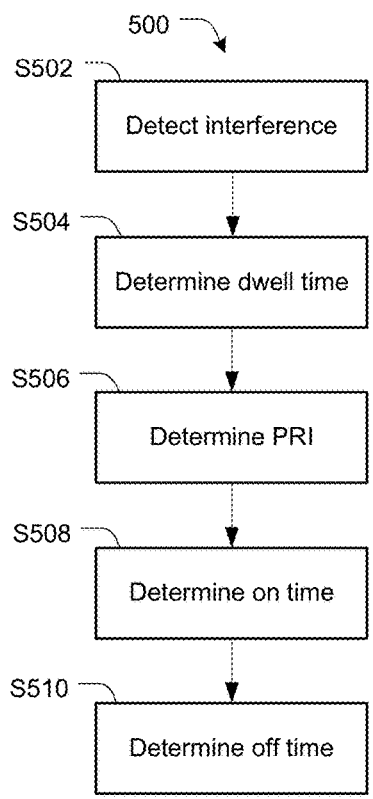
FIG. 5 illustrates an embodiment of a process for characterizing pulsed transmissions.
Figure 6:
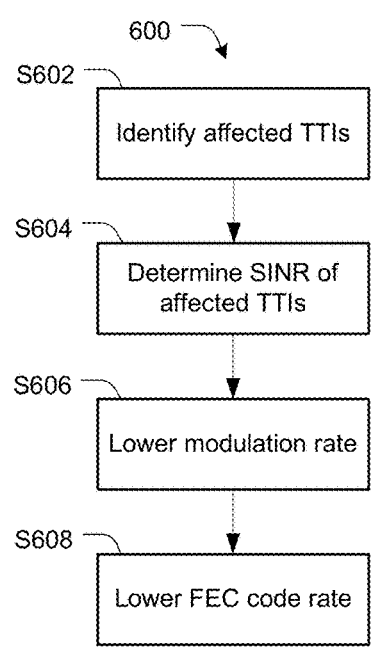
FIG. 6 illustrates an embodiment of a process for changing transmission parameters.

FIG. 4 shows a communication network 400 operating in the same spectrum as a radar system 402. The communication network 400 may have multiple communication links formed between transmit and receive nodes. In the embodiment shown in FIG. 4, the communication network 400 is a cellular system with base stations 404 and UE devices 406.

The communication network 400 may transmit and receive signals using the same frequencies used by the radar system 402, or it may transmit and receive signals in an adjacent frequency band to the frequency band used by the radar system 402. Even when using adjacent frequency bands, the communications system 400 may still experience interference from out-of-band emissions from the radar system 402. Accordingly, embodiments of this disclosure may be used when a communications system 400 communicates in a frequency range which experiences interference from a pulsed interference source.

As explained above with respect to FIG. 3B, depending upon the location of the communication system 400, the communications system may only receive significant amounts of energy from the radar system 402 during those dwell times 322 during which a radar transmitter is pointed in the direction of the communications system 400. Correspondingly, interference energy may also be received at the radar system 402 from the communication system 400, and radar system may experience peak interference from the communications system when the radar receiver is pointed at the communications network. In other embodiments, the communications system 400 may still receive significant amounts of energy from the radar system 402 when the radar system is directing its transmissions in other directions, depending on the antenna pattern of the radar system.

In order to coexist with a radar system, it is desirable for a communications network to be aware of certain aspects of radar transmissions. In an embodiment, known radar parameters such as frequency, PRI 304, on time 306, off time 308, signal strength, rotation period, etc. may be input directly into the communications system 400. However, interference will vary over larger network areas, so parameters that are sufficient to coexist with radar in one sector of the network may not be sufficient for a different sector of the network.

Therefore, in an embodiment, one or more network element such as a base station 404 performs a process 500 of characterizing a radar pattern. Interference is detected by one or more network entity at S502. In one embodiment, interference is detected by user equipment, and reported to the network through an attached base station. In another embodiment, such as when interference is present in uplink frequencies, interference is detected at a base station.

In an embodiment, interference is detected through a communications metric such as a Signal to Interference plus Noise Ratio (SINR). In another embodiment, the interference is detected by directly measuring signal strength of radio frequencies. In such an embodiment, the signal strength may be compared to a threshold value, and signals that exceed the threshold value are classified as interference.

As discussed above with respect to FIG. 3B, a radar transmitter may transmit at a regular interval so that network equipment in geographical areas affected by the radar transmissions experience variations in radar signal strength over time. If the signal strength of individual radar pulses 302 varies in a repeatable pattern, a dwell time may be determined at S504.

Determining a dwell time 504 may include comparing radar signal strength or interference levels to a predetermined threshold value 320. The threshold value may differentiate an acceptable level of interference from an unacceptable level of interference. For example, in an embodiment, the threshold interference value is −104 dBm for a 10 MHz channel bandwidth. The dwell time 322 is the time for which radar interference exceeds the threshold value 320. A separate dwell time may be established for individual network equipment or geographical areas in a network.

In an embodiment, determining a dwell time S504 includes determining time characteristics of a dwell cycle, including a dwell start time, a dwell end time and an interval between dwells. If radar oscillations follow a repeating pattern, determining a dwell time S504 may include determining all characteristics of the pattern so that a system can adapt to the dwell times 322. For example, the system may cease transmissions, adapt parameters or zero out transmissions during the dwell times. Processes that the system may perform during dwell times are discussed in further detail below.

In an embodiment, a Pulse Repetition Interval (PRI) 304 is determined at S506, an on time 306 is determined at S508, and an off time 308 is determined at S510. When determining radar characteristics, variations in the characteristics are also determined. For example, when the duration of pulse widths may vary over time, S508 includes determining this variance. Accordingly, information that is determined in process S500 can be used by a communications network 400 to efficiently coexist with a radar system 402. The presence of radar transmissions may be determined by examining power, bandwidth, and pulse times.

The throughput of a link in a communications network is affected by the channel quality of the link, measured in terms of the SINR, and transmission parameters. In an embodiment, the transmission parameters include a Modulation and Forward Error Correction (FEC) coding scheme. For a given set of transmission parameters, the throughput reduces (eventually going to zero) as the channel quality of the link degrades.

Interference power degrades the SINR of the link. However, it may be possible to maintain the communication link, e.g., to maintain non-zero throughput, albeit with a lower throughput, if the transmission parameters of the link are modified.

In contemporary communication systems, feedback mechanisms are implemented between a receive node and a transmit node to adapt the transmission parameters of the link according to the quality of the link perceived at the receive node. For example, in LTE systems, user equipment sends back Channel Quality Information (CQI) reports to the transmit node. A certain delay is associated with this feedback mechanism. In addition, to reduce the overhead due to the feedback mechanism, the feedback is typically based on average channel statistics rather than instantaneous channel statistics. Due to these factors, transmission parameters of a link are maintained for a finite period of time.

Radar systems may have pulse-widths on the order of a few tens of microseconds and duty cycles on the order of hundreds of microseconds to several milliseconds. These time-scales over which interference from a radar system fluctuates are usually significantly smaller than the durations over which the transmission parameters of a link are adapted in response to channel quality feedback mechanisms. This leads to sub-optimal throughputs for the link since instantaneous variations in channel quality due to radar interference fluctuations may not be exploited by the communication system.

In embodiments of this disclosure, information about the radar system is exploited to improve the throughput of the link. By performing process 500 or through direct input, the start time, pulse width and PRI of the radar information is available at the communication system. From this information, time durations during which the radar transmission is present, referred to here as radar on-time, can be determined by the communication system. If the transmissions of the radar system are periodic for a significant period of time, it may also be possible for the communication system to predict the time durations over which the radar transmission are present and interfere with the communication system.

Figure 7:
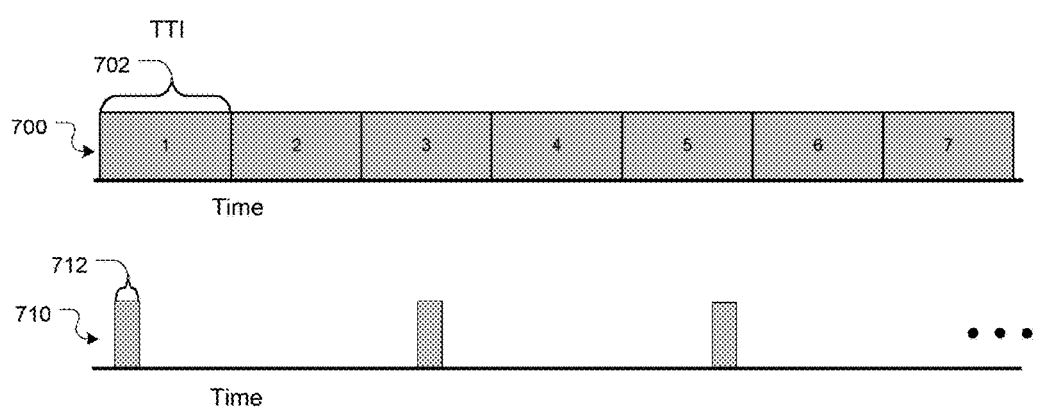
FIG. 7 illustrates wireless transmissions and radar transmissions.

In a communication system, transmissions are typically scheduled in fixed time intervals which are referred to here as Transmission Time Intervals (TTIs). For example, in LTE systems, TTIs have a 1 ms duration. FIG. 7 shows an example of cellular transmissions 700 which include a plurality of sequential TTIs 702 transmitted over a time period. In addition, FIG. 7 shows radar pulses 710 over the same time period.

A process 600 for changing transmission parameters starts by identifying affected TTIs 702 at S602. Turning to FIG. 7, radar pulses 712 overlap with TTIs 702 numbered 1, 3, and 5. Thus, the TTIs 702 numbered 1, 3, and 5 will experience interference from the radar transmissions, so they are identified as affected TTIs at S602. In an embodiment in which an oscillating radar system is present, identifying TTIs may include identifying TTIs that correspond to dwell times 322.

In a communications system, a certain set of transmission parameters are used for a communication link in the absence of interference from a radar system. These parameters are continued to be used in the TTIs 702 in which the radar on-time does not overlap with the TTI of the communication link. However, in the TTIs which overlap with radar pulses 712, the transmission parameters are adjusted to maintain the link.

At S604, the SINR of affected TTIs may be determined. In an embodiment, the expected SINR of the communication link in the presence radar interference is calculated based on location and transmit power level information about the radar system so that transmission parameters can be chosen based on expected performance. If the expected SINR cannot be calculated in advance, the SINR may be determined iteratively by monitoring the link performance.

In process 600, transmission parameters are adjusted for affected TTIs. In an embodiment, the transmitter parameter adjustments that are made trade the throughput of the link for improved received SINR per information bit. For example, a modulation rate may be lowered at S606 so that there is more separation between the constellation points. For example, if a modulation rate that is used by a communications system for TTIs 712 that are not affected by radar transmissions is 64 QAM, S606 may include lowering the modulation rate to 16 QAM.

In an LTE system, about 30 different modulation and coding schemes (MCS) can be used for the transmission link between an eNodeB and user equipment. Higher order MCSs offer more throughput, but are more susceptible to degradation from interference. Lower order MCSs trade throughput of the link for larger SINR per information bit. Thus, in an LTE system, a lower order MCS scheme that maintains the link albeit at a lower throughput is chosen for TTIs 702 in which interference is expected at S606.

Similarly, at S608, a FEC is lowered for TTIs 702 which are affected by radar transmissions such as radar pulses 712. A lower FEC code rate has a higher redundancy, and therefore is more robust to interference. In some embodiments, both of the FEC and modulation rates are lowered for affected TTIs 702. S606 and S608 may be performed a plurality of times and regularly adjusted to optimize data transfer for a communications system in the presence of radar interference.

Figure 8:
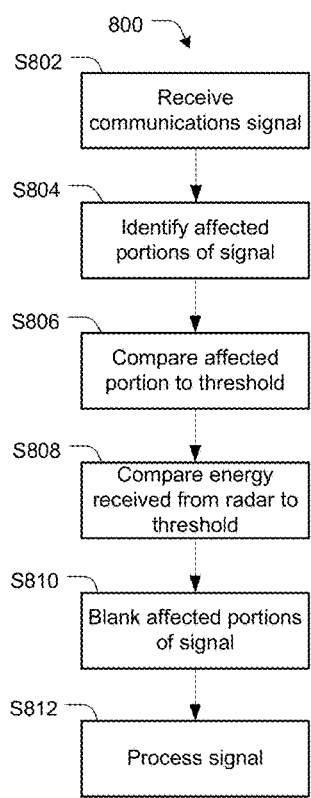
FIG. 8 illustrates an embodiment of a process for blanking signals.

FIG. 8 shows a process 800 of blanking the portions of transmitted signals that are affected by radar. At S802, a communications signal is received by a network element such as a base station. More specifically, a communications signal that overlaps with a radar transmission is received at S802.

At S804, portions of the signal received at S802 that are affected by a radar transmission are identified. Identifying the affected portions S804 may include determining interference that is present in the signal, or comparing times of radar pulses to signal reception times. For example, TTIs 702 may be divided into a number of portions, and the system may identify which portions of the TTIs overlap with radar pulses. In another embodiment, a value such as SINR may be measured for each portion of the signal, and if the SINR is below a threshold for a particular portion, S804 determines that particular portion is affected.

In LTE systems, each TTI 702 contains 14 OFDM symbols. Thus, an embodiment may divide the TTI into two halves and determine that an interfering radar transmission was present for the first half of the signal, thereby identifying the first 7 OFDM symbols as being affected.

At S806, the affected portion of the signal may be compared to a predetermined threshold value, and if the affected portion exceeds the predetermined value, the affected portions of the signal are blanked at S810. For example, if S804 in an LTE system determines that seven symbols are affected and the predetermined value is two, then the seven affected symbols are blanked out. Similarly, if S804 identifies one OFDM symbol as being affected, then the signal is not blanked at S810. When a portion of a signal is blanked out at S810, that portion of the signal is not processed. Blanking out may include deleting the affected portion or instructing a processor to not process the affected portion.

At S808, the energy received from the radar transmission is compared to a threshold value. The threshold value may be set based on whether a system can successfully process the signal in the presence of a radar transmission. In other words, the threshold value may be a value above which there is a significant probability of processing errors. Particular thresholds may be calculated on the basis of simulation analysis or performance measurements.

At S812, the received communications signal is processed. Blanked subcarriers carrying data may be processed as though data with zero energy was received. Thus, if portions of the signal were affected by radar transmissions, then only unaffected portions of the signal are processed. However, if the affected portion of the signal was less than the predetermined threshold value of S808, then the entire signal including the affected portion may be processed. If subcarriers carrying reference signals used for channel estimation have been blanked, then the channel estimation algorithms may ignore these subcarriers when making estimates of the channel gains.

It has been observed through experiments that zeroing out the received energy improves the performance of the system as opposed to processing the TTI 702 without any modifications when the received interference power from the radar transmission is high. A reason for the improvement is because high interference powers bias the statistics used in the decoding, demodulation or equalizer processes at the receiver.

Figure 9:
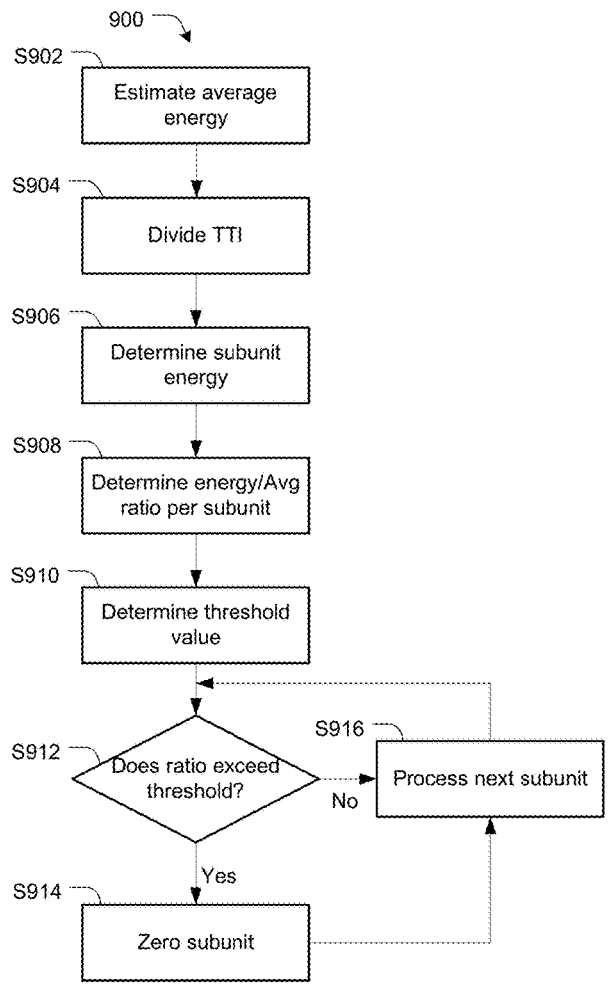
FIG. 9 illustrates another embodiment of a process for blanking signals.

FIG. 9 shows a process 900 for blanking received energy that may be performed without information from the radar system. Average energy in a TTI without interference is estimated at S902. The energy may be estimated based on key performance indicator (KPI) data, network conditions, etc. Next, the TTI may be divided into subunits at S904. For example, in an LTE system, the TTI may be divided into as few as two subunits of seven symbols, or as many as 14 subunits of a single symbol.

At S906, the energy of each subunit is determined, and at S908, a ratio between the energy of each subunit and the estimated average energy is calculated for a subunit. At S910, a threshold value may be determined on the basis of simulation analysis or performance measurements. In an embodiment, a threshold value may be determined once for a system.

At S912, the ratio between the received energy and the calculated average of a subunit is compared to the threshold value from S910. For example, in an LTE system, in the 1 ms TTI, if the energy in an OFDM symbol relative to the average energy of the block is greater than the threshold value, the OFDM symbol is zeroed out. If the ratio exceeds the threshold value, then the subunit is blanked at S914 as discussed with respect to S810, and the next subunit is processed at S916.

A radar system is a pulsed system with a duty cycle that is typically much less than 100%. Hence the off-time within a PRI 1004 of a dwell-time is a significant portion of the PRI. If start time, pulse widths and PRI information is available at the communication system, then the communication links may opportunistically schedule transmissions during the off-times 1008. Such an embodiment is shown in FIG. 10.

Figure 10:
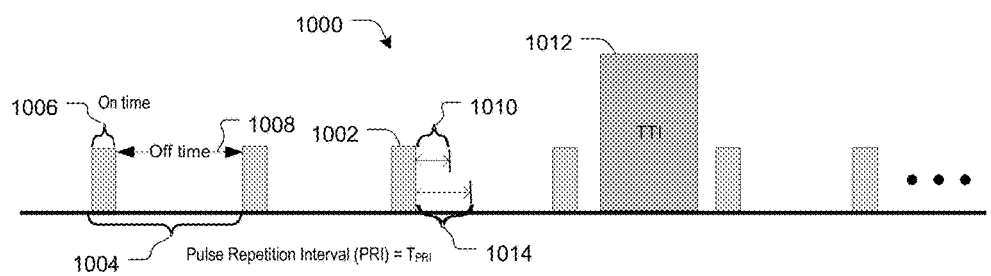
FIG. 10 illustrates an embodiment of an intra-dwell transmission.

As seen in FIG. 10, wireless transmissions such as TTI 1012 may be transmitted between radar pulses 1002, which is referred to here as an intra-dwell transmission since data transmissions in the communications network take place during dwells. Intra-dwell transmissions are feasible when the time of the TTI is less than the off-time 1008 between pulses 1002.

In an embodiment in which radar off-times 1008 are significantly longer than channel quality feedback times, intra-dwell scheduling can be implemented even when no or limited information about the radar system is available. The transmit node monitors the channel quality feedback. If the channel quality degrades, it can infer the presence of a radar pulse 1002. Correspondingly if the channel quality improves, the node can infer the off-time 1008 of the radar system.

Figure 11:
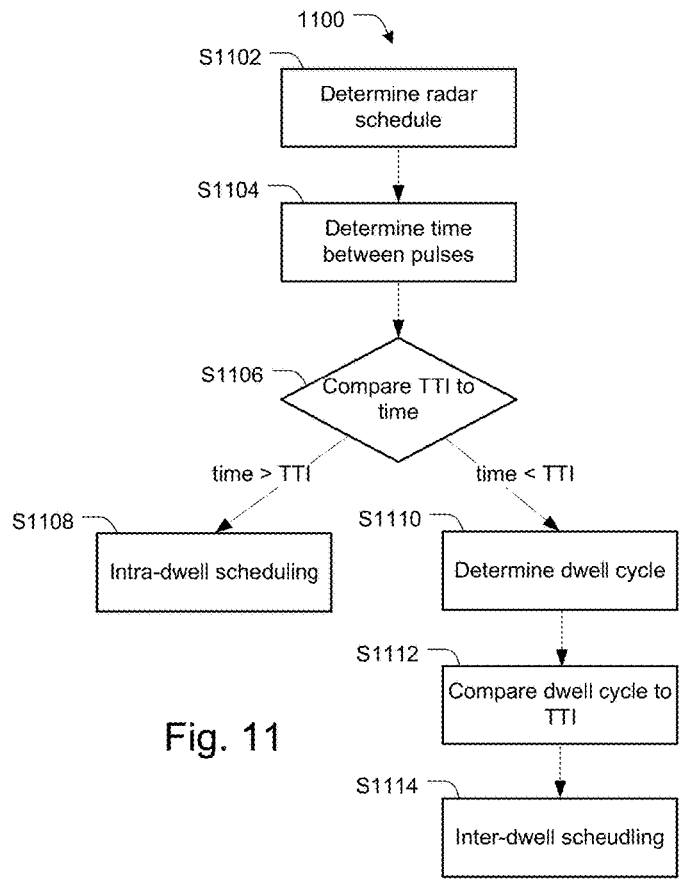
FIG. 11 illustrates an embodiment of a process for transmissions in the presence of radar.

FIG. 11 shows a process 1100 of scheduling transmissions in the presence of radar. At S1102, aspects of a radar schedule are determined. The radar schedule may be determined in accordance with process 500 of characterizing a radar pattern as discussed above. Aspects of the schedule that may be determined at S1102 include a PRI 1004, an on time 1006, an off time 1008, a receive time 1010 and a saturation time 1014.

Radars typically transmit at high power-levels and could saturate the receive circuitry in communication nodes. If this happens and the off-times 1008 are insufficient to alleviate the saturation condition of the receivers, the communication system may not be able to successfully transmit in the off-times. Accordingly, determining the radar schedule 1102 may include determining saturation time 1014.

At S1104, the process determines a time between pulses 1002. In one embodiment, the time determined at S1104 may simply be the off time 1008. In another embodiment, the time determined at S1104 may be the off time 1008 minus the receive window 1010. In other embodiments, the time determined at S1104 may be the off time 1008 minus the saturation time 1014, or the off time 1008 minus the greater of the receive window 1010 and the saturation time 1014 (if the receive window 1010 overlaps with the saturation time 1014) or the off time 1008 minus the receive window 1010 and the saturation time 1014 (if the receive window 1010 does not overlap with the saturation time 1014). A buffer of a predetermined time may be subtracted from the off-time to account for other factors in a communications system, such propagation time and schedule variance.

At S1106, a TTI 1012 is compared to the time determined at S1104. If S1106 determines that the time between pulses is greater than the TTI 1012, then intra-dwell scheduling may be performed at S1108. Intra-dwell scheduling may include scheduling one or more transmission 1012 in the time between radar pulses 1002. As discussed above, the transmission 1012 may be scheduled during an opportunity which may be defined by a combination of an off-time 1008 minus one or more of a receive window 1010 and a saturation time 1014.

As discussed above with respect to FIG. 3B, a radar transmitter may change direction over time to cover a larger geographic area than a stationary radar. Such systems typically change direction in a regular repeating pattern. A node will receive maximum energy levels from the radar when the radar is pointed directly at the node, and it will receive decreasing levels of energy as the radar moves to point away from the node.

Figure 12:
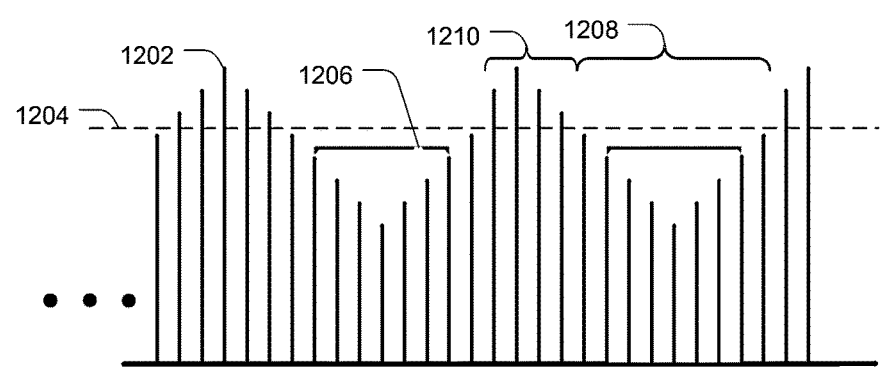
FIG. 12 illustrates an embodiment of an inter-dwell transmission.

FIG. 12 shows an embodiment of energy levels experienced by a node which receives energy from a radar transmission. As the radar points towards the node, energy levels reach a peak value at the pulse marked as 1202, and as the radar points further away from the node, energy levels progressively decrease. In an embodiment, radar energy levels experienced by the node decrease below a threshold value 1204 to define a transmission opportunity 1208.

Radar may not interfere with communication system during all pulses 1202. The time during which pulses 1202 interfere with the communication system above threshold 1204 are referred to here as interfering dwells 1210. In an embodiment, threshold energy level 1204 is set at a point above which pulses 1202 are interfering pulses with substantial signal degradation, and below which it is possible to transmit data 1206 without substantial degradation. An example interference threshold value for a channel bandwidth of 10 MHz is −104 dBm. Therefore, S1110 may include determining a transmission opportunity 1208 which is a time between interfering pulses 1202, or a time during which radar energy is expected to be below threshold level 1204. The term transmission opportunity may also be used with respect to a time between pulses 1202 that is sufficient to schedule a TTI.

At S1112, the transmission opportunity 1208 is compared to a transmission time to transmit data 1206, which may be a TTI. If the transmission opportunity 1208 is greater than the transmission time, then inter-dwell scheduling may be performed at S1114. Inter-dwell scheduling includes scheduling one or more transmissions during the opportunity 1208. If information about the dwell timing is available at the communication system, then the communication links can opportunistically schedule transmissions during the opportunity 1208 between interfering dwells 1202.

In an embodiment in which opportunities 1208 are longer than channel quality feedback times, inter-dwell scheduling can be implemented even when no or limited information about the interfering dwell time 1210 is available. In such an embodiment, the transmit node monitors channel quality feedback, and if the channel quality degrades, the start of an interfering dwell time 1210 can be determined Correspondingly, if the channel quality improves, the end of the interfering dwell time 1210 can be determined.

To prevent the links from transitioning to a disconnected or idle state if there is inactivity in the link during the interfering dwell times 1210, the connection timers associated with the communication systems can be configured so that communications connections won't time out during the interfering dwells. For example, in LTE systems, the connection timer T310 in user equipment may be modified to maintain connectivity in the presence of inactivity of the link from an eNodeB to the user equipment.

What is claimed is:

1. A method for scheduling wireless transmissions in a wireless communications network in the presence of pulsed interference, the method comprising:
   receiving pulsed interference information;
   determining transmission opportunities based on the pulsed interference information; and
   when a transmission time interval (TTI) is less than a time of an opportunity of the transmission opportunities, transmitting a wireless signal during the opportunity,
   wherein determining transmission opportunities includes identifying off-times between radar pulses and determining a buffer time between pulse times, and
   wherein the transmission opportunities are off times between pulses minus the buffer.

2. The method of claim 1, wherein the buffer time is a receive window in which a radar receives reflections.

3. The method of claim 1, wherein the buffer time is a saturation time during which a receiver is saturated by a received pulse.

4. The method of claim 1, wherein determining transmission opportunities further includes determining radar dwell times.

5. The method of claim 4, wherein determining radar dwell times includes:
   identifying a plurality of consecutive radar pulses; and
   comparing the plurality of consecutive radar pulses to a threshold value,
   wherein the dwell time is a time during which a portion of the consecutive radar pulses exceeds the threshold value.

6. The method of claim 5, wherein additional transmission opportunities are identified as times between dwell times.

7. A communications system, the system comprising:
   a receiver that receives pulsed interference information;
   a scheduling module that determines transmission opportunities based on the pulsed interference information, and
   a transmitter that transmits a wireless signal during an opportunity of the transmission opportunities when a transmission time interval (TTI) is less than a time of the opportunity,
   wherein determining transmission opportunities includes identifying off-times between radar pulses and determining a buffer time between pulse times,
   wherein the transmission opportunities are off times between pulses minus the buffer.

8. The communications system of claim 7, wherein the buffer time is a receive window in which a radar receives reflections.

9. The communications system of claim 7, wherein the buffer time is a saturation time during which a receiver is saturated by a received pulse.

10. The communications system of claim 7, wherein the scheduling module determines radar dwell times.

11. The communications system of claim 10, wherein the scheduling module determines radar dwell times by identifying a plurality of consecutive radar pulses and comparing the plurality of consecutive radar pulses to a threshold value, and
    wherein the dwell time is a time during which a portion of the consecutive radar pulses exceeds the threshold value.

12. The communications system of claim 11, wherein additional the transmission opportunities are times present between dwell times.

13. A method for scheduling wireless transmissions in a wireless communications network in the presence of pulsed interference, the method comprising:
    receiving pulsed interference information;
    determining transmission opportunities based on the pulsed interference information; and
    when a transmission time interval (TTI) is less than a time of an opportunity of the transmission opportunities, transmitting a wireless signal during the opportunity,
    wherein determining transmission opportunities includes:
       comparing a TTI to an off time between pulses;
       when the TTI is less than the time between pulses, identifying the transmission opportunities in times between pulses; and
       when the TTI is greater than the time between pulses, determining whether a dwell time is present in a pulse pattern.

14. A communications system, the system comprising:
    a receiver that receives pulsed interference information;
    a scheduling module that determines transmission opportunities based on the pulsed interference information, and
    a transmitter that transmits a wireless signal during an opportunity of the transmission opportunities when a transmission time interval (TTI) is less than a time of the opportunity,
    wherein the scheduling module determines transmission opportunities by:
       comparing a TTI to an off time between pulses;
       when the TTI is less than the time between pulses, identifying a transmission opportunity in the time between pulses; and
       when the TTI is greater than the time between pulses, determining whether a dwell time is present in a pulse pattern.

* * * * *